United States Patent [19]
McCall et al.

[11] Patent Number: 5,396,623
[45] Date of Patent: Mar. 7, 1995

[54] METHOD FOR EDITING THE CONTENTS OF A $DB_2$ TABLE USING AN EDITPROC MANAGER

[75] Inventors: Annette B. McCall; Edward J. Veazey, Jr., both of Houston, Tex.

[73] Assignee: BMC Software Inc., Houston, Tex.

[21] Appl. No.: 969,014

[22] Filed: Oct. 30, 1992

[51] Int. Cl.$^6$ .................... G06F 7/08; G06F 7/10
[52] U.S. Cl. ............... 395/600; 364/DIG. 1; 364/222.81; 364/222.9; 364/225.8
[58] Field of Search ..................... 395/600

[56] References Cited

U.S. PATENT DOCUMENTS 5,159,180  10/1992  Feiler ..................... 235/375
5,222,235   6/1993  Hintz et al. ............. 395/600

OTHER PUBLICATIONS

"Writing Exit Routines" Administration Guide, vol. III; p. X-75; IBM Database 2 Version 2, No. Date.

*Primary Examiner*—Paul V. Kulik
*Assistant Examiner*—Jean R. Homere
*Attorney, Agent, or Firm*—Arnold, White & Durkee

[57] ABSTRACT

A computer-executed method permits one or more of the following three functions to be performed on a DB2 data table: (1) dynamically altering (replacing) the EDITPROC parameter in the DB2 catalog definition of the DB2 data table, without the necessity of unloading the data from the table; (2) dynamically adding an EDITPROC to an existing DB2 data table whose DB2 catalog definitional information does not include an EDITPROC parameter; and (3) dynamically adding a column (field) to an existing DB2 data table that already includes an EDITPROC. The method does not make the assumption, made by IBM's DSNUTILB utility program, that the DBD records for a given database are untrustworthy and that all definitional information therefore must be verified. The method makes use of code to trick DB2 into bringing certain definitional information for the data table in question, including the DBD and OBD records, into memory from DASD (disk) storage. The method also makes use of a swapping routine which provides a dynamic procedure for exchanging DBD and OBD information between the DB2 table to be modified and a shadow DB2 table which already contains the modified DBD and OBD information.

10 Claims, 9 Drawing Sheets

METHOD FOR EDITING THE CONTENTS OF A DB2 TABLE USING AN EDITPROC MANAGER

BACKGROUND OF THE INVENTION

This invention relates to computer database systems, and more particularly to computer program-implemented methods for editing the definition of a table, in a database managed by IBM's DATABASE 2 (DB2) software, and specifically for editing the definition as it relates to the table's EDITPROC parameter.

1.1 DB2 Database Systems

The IBM DB2 software is described in detail in various publications of the IBM Corporation, particularly the so-called "IBM Database 2 Version 2 Release 2 Library" which is a collection of ten books including titles such as "Application Programming and SQL Guide" which has a document reference of SC26-4377-1. (All reference to a part of the IBM Database 2 Version 2 Release 2 Library will be accompanied by a document reference.) The acronym SQL refers to the term "Structured Query Language." A useful general-purpose introduction to database management systems, with some coverage of DB2, is the published textbook FUNDAMENTALS OF DATABASE SYSTEMS, by Elmasri & Navathe, (Benjamin/Cummings Publishing Co. 1989; hereinafter "Fundamentals"). Familiarity with the topics discussed in these and similar publications, which are well known to those of ordinary skill, will be assumed. For convenience, references to specific portions of these publications are made at various places in the discussion below.

1.2 DB2 Cataloguing of Data Table Definitions

A database that is managed with DB2 utilizes one or more tables for information storage. As shown in FIG. 1, each of a number of tables 10, 11, 12, 16, 18, relating generally to a company's employees and work in progress, includes a plurality of rows 13 (referred to as "records") as well as a plurality of columns 14 (referred to as "fields").

DB2 data tables may be linked in relation to one another by particular fields/columns. For example, in FIG. 1 the PROJECTS table, 11, is linked to the EMPLOYEES table, 10, via a key column EMPLOYEE_NO, 15. In this way, detailed information about an employee working on a particular project need not be redundantly stored in the PROJECTS table, but instead can be referenced via a pointer to the EMPLOYEES table, i.e., the PROJ_NO field 15, in the PROJECTS table 13 is a pointer to the EMPLOYEE_NO field 15, in the EMPLOYEE table 10.

DB2 stores information about the definitional structures of DB2 database tables in a series of "catalog" tables (in standard DB2 table format), referred to generally as SYSCATALOG. These tables describe the structure and format of all the different DB2 databases in the system, including the EDITPROCs associated with each data table.

This is illustrated in FIG. 2, which shows representative catalog tables SYSTABLES 25, SYSCOLUMNS 26, SYSDBAUTH 28, and SYSTABAUTH 29. Each record/row in these tables contains definitional information about a specific table. For example, the DBNAME field/column in the SYSTABLES table 25 identifies the databases to which DB2 data tables belong. Similarly, the SYSCOLUMNS table 26 stores information about the field/column structure of DB2 data tables. See generally, e.g., Chapter 17 and Section 23.1.3 of the aforementioned Fundamentals reference for a more detailed discussion of database catalogs in general and of the DB2 catalog structure in particular.

The SYSCATALOG tables are stored in a format meant for human utilization, e.g., with alphanumerics and human-readable flags. For performance reasons, DB2 also maintains another set of tables in a machine-optimized code, referred to as the DBDs or data base descriptor tables.

When a data table is created under DB2, the tables' DBD records are created at the same time as its SYSCATALOG records. While DB2 is executing on a table (i.e., actively processing one or more records from the table), the DBD records that describe the table are held in memory, whereas the DBD records for inactive tables are stored in DASD storage.

1.3 Resynchronization of SYSCATALOG and DBD

A great deal of information is duplicated between the SYSCATALOG tables and the DBD tables for a given DB2 data table. The correspondence between the two is not one to one, however. Some information is stored in the SYSCATALOG tables that is not kept in the DBD tables, and vice versa. As a result, the SYSCATALOG tables and the DBD tables can lose synchronization because of hardware failures and the like.

To address possible desynchronization of the SYSCATALOG and DBD information, IBM provides a DBD repair utility program commonly referred to as DSNUTILB. In brief, this utility program resynchronizes a corrupted DBD by going to the SYSCATALOG tables and finding, for the specified user database (i.e., collection of tables, etc.), some of the information needed to rebuild the DBD records. However, DSNUTILB must eventually go to the user database itself for more information to complete resynchronization. (See generally "Command and Utility Reference" SC26-4378 for more information about DSNUTILB.)

As part of its rebuilding process, DSNUTILB assumes the DBD records for the user database are untrustworthy and scans everything in the user database itself to verify the definitional information needed to rebuild/resynchronize those DBD records. For a large user database, this process could take a long time, on the order of hours.

1.4 The EDITPROC Parameter of a DB2 Table

As well known to those of ordinary skill, one feature of DB2 is its EDITPROC facility. During table creation, the designer of a DB2 database can specify, for a particular DB2 table, an optional EDITPROC parameter that is written into the table's SYSCATALOG and DBD records. Specifically, the catalog entries that identify and indicate the existence of an EDITPROC are the EDPROC and RECLENGTH parameters. (See generally Sections 23.1.2 and 23.1.5 of the Fundamentals publication for a general discussion of DB2 tables, and "SQL Reference" SC26-4380 for a discussion of the EDITPROC parameter.)

The EDITPROC parameter is the name of a user exit routine, i.e., a set of instructions for manipulating database record information. This routine is commonly referred to as an EDITPROC routine or simply as an EDITPROC and may be custom-built by the database designer or alternatively may be a preexisting set of instructions.

EDITPROCs are typically used for on-the-fly data compression/decompression, encryption/decryption, and the like, of data stored in DB2 table records. When DB2 processes a read or write query for a given DB2 table, control is passed to the EDITPROC, if one is defined for that table. The EDITPROC has access to limited definitional parameters for the DB2 table in question. Because the EDITPROC is given control by DB2 whenever a read or write operation is requested, the EDITPROC can examine (and compress, encrypt, etc., if desired) every row/record as it is written to or read from the table.

(Those of ordinary skill will recognize that a reference such as "control is passed to the EDITPROC," and similar references to actions being performed by a computer program, represent a conventional shorthand expression meaning that a processor executes instructions comprising the EDITPROC routine.)

In essence, the DB2 catalog table-definition parameters accessible by an EDITPROC comprise format information to enable the EDITPROC to know how to encode/decode the various fields of the DB2 table. It does not, however, include the table name or other information that would readily permit the EDITPROC to determine which record/row it is processing. As a result, an EDITPROC cannot readily operate "between" rows in a table, e.g., it cannot copy data from one row to another nor compress data in one row based on data obtained from some other row.

1.5 Difficulty of Altering EDITPROCs

A DB2 table's EDITPROC parameter (the SYSCATALOG and DBD pointers to a specific EDITPROC routine that is associated with that table) is difficult to alter if the data table is "loaded," that is, if the table contains actual data. (The term DB2 data table and DB2 table are used interchangeably herein to depict a DB2 table that contains data as opposed to DB2 definitional information.) Because EDITPROC routines can be extremely field-sensitive as discussed below, DB2 does not permit editing of the table's SYSCATALOG and DBD entries that identify the table's defined EDITPROC.

Instead, a cumbersome procedure must be used to change a table's EDITPROC. First, the data table must be unloaded, i.e., its user data must be removed and stored in backup storage. Second, the desired changes to the (now empty) table's SYSCATALOG and DBD entries must be made using standard SQL statements. Finally, the user data must be reloaded into the redefined table. (See generally "Administration Guide, Vol. II" SC26-4374.)

The potential field sensitivity of an EDITPROC routine arises from the fact that it can be "hard-coded" by its designer to work with specific field formats. That is, the EDITPROC can be written to take advantage of preexisting knowledge about a particular DB2 table's field structure. Such EDITPROCs can be extremely dependent on having the DB2 table conform precisely to the field structure in question. If the table does not conform, the results of specifying that EDITPROC for the table can be unpredictable.

2. SUMMARY OF THE INVENTION

A utility method in accordance with the present invention, executed by a suitably programmed processor, permits one or more of the following three functions to be performed on a DB2 data table, even though DB2 normally does not permit any of the functions to be performed:

(1) Dynamically altering (replacing) the EDITPROC parameter in the DB2 catalog definition of the DB2 table, without the necessity of unloading the data from the table;

(2) Dynamically adding an EDITPROC to an existing DB2 table whose DB2 catalog definitional information does not include an EDITPROC parameter; and (3) Dynamically adding a column (field) to an existing DB2 table that already includes an EDITPROC.

The utility method does not make the assumption, made by IBM's DSNUTILB utility program (see Section 1.3), that the DBD records for a given database are untrustworthy and that all definitional information therefore must be verified. The method edits the SYSCATALOG definitional information to conform the SYSCATALOG data to one of the above mentioned functions, but instead of calling the DSNUTILB utility program to rebuild the entire set of DBD records for the DB2 database in question, the method edits the DBD records to match the changes made to the SYSCATALOG. The method must also check all the table's OBID INDEXES and RI constraints fansets to ensure that all parent relationships conform to the modification; otherwise relationships between tables can be corrupted. (See generally, e.g., DB2 Diagnosis Guide & Reference LY27-9536, page 339, for a more detailed explanation of INDEX and RI constraint fanset information.)

The utility method makes use of a set of instructions that trick DB2 into bringing certain definitional information for the data table in question into memory from DASD (disk) storage, including the DBD records. That information is then edited appropriately and saved back to DASD storage with an SQL COMMIT statement so that the modifications needed to accomplish one of the functions can be externalized (see generally pp. 680–682 of the Fundamentals publication concerning COMMITs).

3. BRIEF DESCRIPTION OF THE DRAWINGS

4. DETAILED DESCRIPTION OF SPECIFIC EMBODIMENTS

Figure 1:
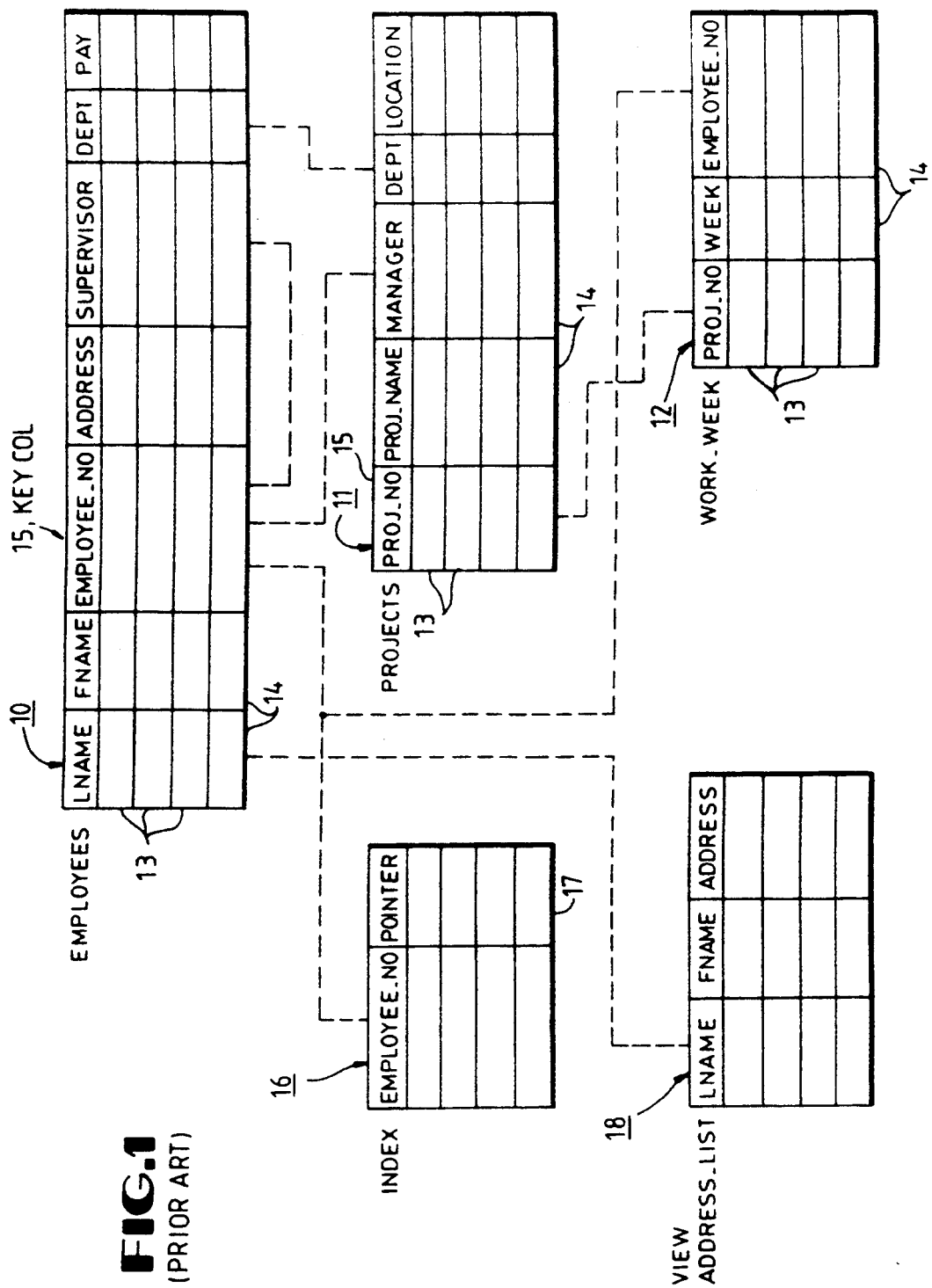
FIG. 1 depicts a set of hypothetical DB2 data base tables.
Figure 2:
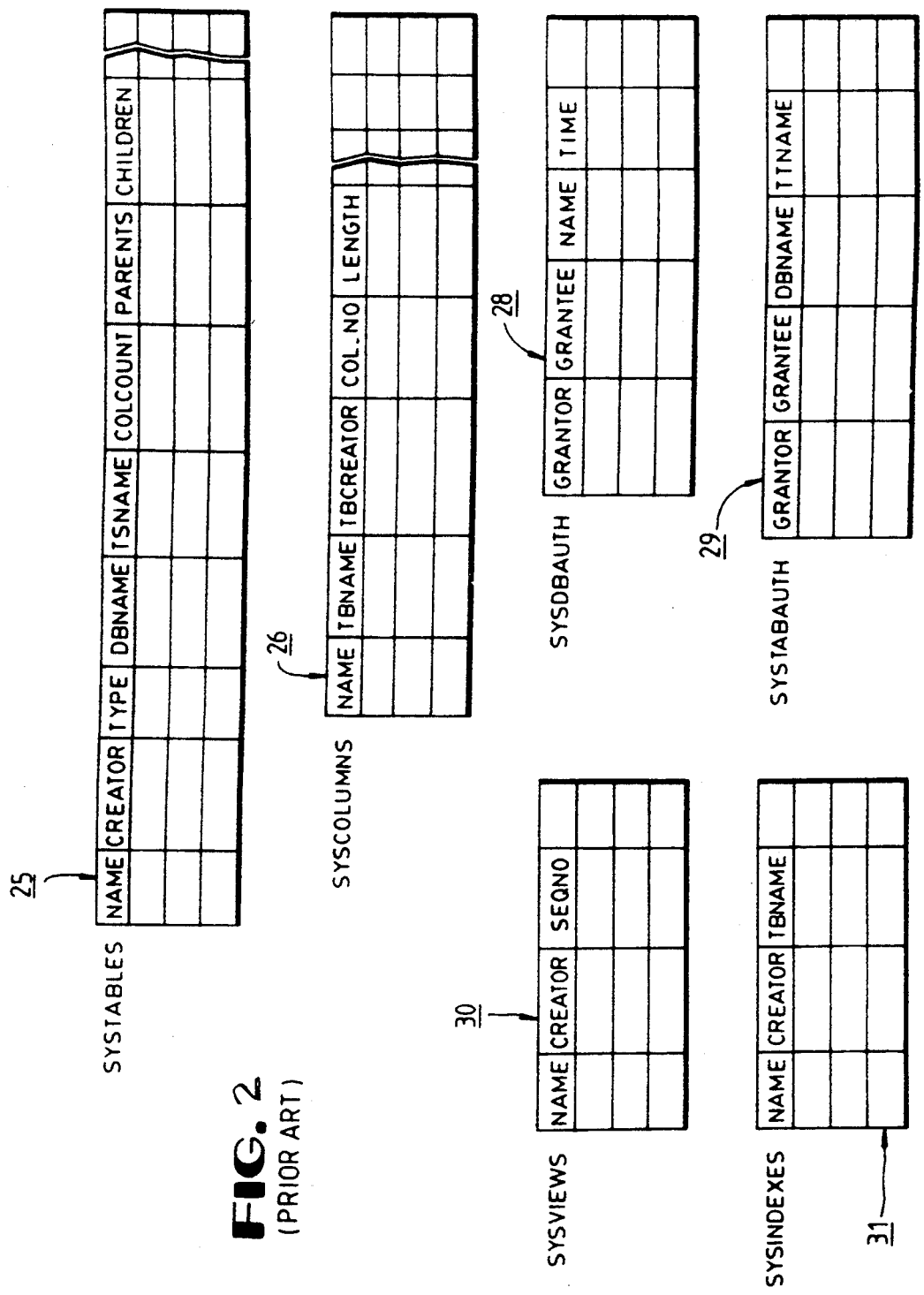
FIG. 2 shows selected DB2 SYSCATALOG tables.

An illustrative utility-program method in accordance with the invention is described below. The method may be implemented in the form of a computer program referred to here as "AMEND," executing on a computer system (not shown) in which DB2 is resident. The method will be described via the actions of the AMEND program. It will be understood by those of ordinary skill that all references to actions taken by the program AMEND are actually to actions taken by the computer system executing the instructions comprising the program AMEND.

4.1 Initialization

Initially, AMEND issues a number of DB2 catalog table declarations with standard SQL statements. Any DB2 table used in a DB2 application must generally be represented in such declarations. AMEND then maps certain structures in the DB2 address space on the computer system; these structures are documented in the aforementioned publications, e.g., in the Diagnostic Manual, Chapter 7-3.

The AMEND program performs additional initialization steps, including resolving the target table. For example, the module SYSTABLES DATA DSECT sets up dummy table references (storage maps, descriptors) that may be used by batch utilities such as AMEND itself; those dummy references are more efficient in their use of space in the load module than control sections, referred to as CSECTs. AMEND next sets up a number of data structures, including the Process Control Block, the Table Name Block, the partition descriptor, the EDITPROC Table, among other structures created during initialization.

AMEND's main routine performs housekeeping and validity checking. It invokes macro routines to build internal data structures describing the DB2 catalog table SYSIBM.SYSCOLUMNS (by convention, DB2 catalog table identifiers start with SYSIBM.) Similarly, the main routine invokes macros to build and fill in data structures describing the DB2 catalog table SYSIBM.SYSTABLES. These macro routines are regarded as conventional and do not form a part of the present invention. Additional housekeeping and initialization functions are performed, including checking the status of AMEND's connection with DB2. AMEND also executes necessary MVS services to force multiple AMENDS running against the same DB2 subspace to execute in a serial manner.

The main routine also checks to ensure that the user requesting an AMEND function has proper DB2 authorization to do so by issuing an SQL SELECT statement to query the DB2 catalog tables SYSIBM.SYSDBAUTH, SYSIBM.SYSTABAUTH, and SYSIBM.SYSUSERAUTH to verify that the specific user requesting the AMEND function, as identified by a user ID, has proper authority to perform the requested AMEND operation. Additionally, AMEND accesses security work areas that have been built by DB2 for the current DB2 connection. These work areas contain primary and secondary (if such exist) user ids.

Specifically, AMEND tests whether the user has any of the following authorities, any of which is effectively the same as AMEND authority: (1) maintenance authority on the database, which is essentially the same as ALTER authority on every table in the database; (2) system administrator authority; (3) SYSADM1 authority; or (4) whether the generic user ID "PUBLIC" has proper authority on the DB2 table in question. If none of the foregoing is true, i.e., the user has none of the indicated authorities, then the user does not have sufficient authority to perform an AMEND function, and AMEND accordingly terminates processing of the AMEND request after conventional clean-up operations.

AMEND then starts the user database and tablespace to allow the AMEND routine to access user database and tablespace information.

AMEND next performs a SEARCH OBD operation to get current values from the OBD records (a DB2 data structure) for the target (user) table, i.e., the DB2 table to be modified by AMEND. Generally speaking, this entails tracing through a chain of DBD records as documented in IBM DATABASE 2 Version 2, Diagnosis Guide and Reference Release 1, manual no. LY27-9536-0, at chapter 4-6, "Diagnosing DBD Inconsistencies." The tracing process is in essence a straightforward linear search, starting at the beginning of the chain and working through it, until the target table DBD and OBD records are located.

AMEND also performs validity checking, comparing the obtained OBD values with the equivalent values obtained from the DB2 catalog (obtained by conventional means) for consistency. If the two sets of values do not agree, the representation of the OBD values obtained previously is forced to agree with the values obtained from the catalog (because of precedent: an IBM function gives catalog information priority over OBD information). These values normally should not be in disagreement, however. The most likely reason for disagreement is if AMEND was interrupted prior to completion, e.g., by a hardware failure; forcing of consistency in this way thus serves as part of a recovery from interrupted execution of AMEND. (See Section 4.6, Recovery from a Pre-maturely Ended AMEND Function.)

AMEND's forcing of agreement between equivalent OBD and catalog values entails more than simply correcting AMEND's own representation of the OBD values. Instead, AMEND edits the actual OBD data itself with standard IBM cross-memory services to ensure that any inconsistencies are corrected and externalized.

4.2 Generic Description of AMEND Functions

AMEND now has performed all the preliminary information gathering and AMEND can now perform one of the functions that actually modifies the target table in the desired manner.

Figure 3:
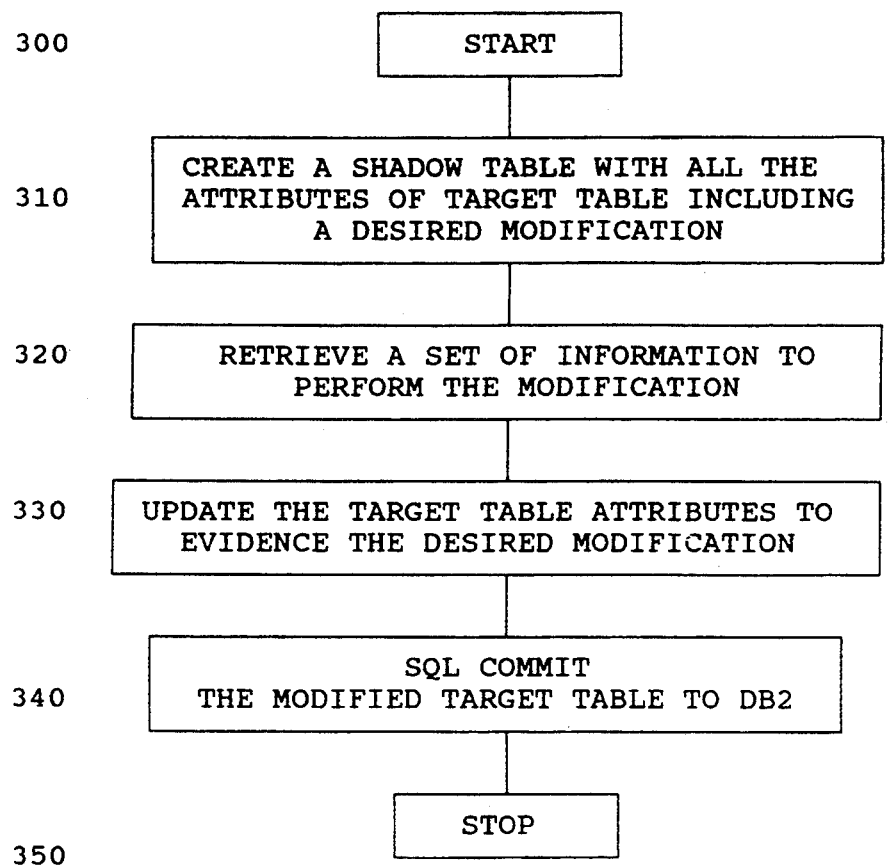
FIGS. 3 through 9 illustrate particular aspects of the inventive method.

Generically, the three AMEND functions described above share key process steps in common:

(1) creating a shadow table (and a shadow tablespace if needed, see below), an exact copy of a target table, except the shadow table includes a desired modification wherein the modification comprises one of: (a) replacing an existing EDITPROC with a new EDITPROC; (b) adding an EDITPROC to a table that does not have an EDITPROC; or (c) adding a column to an existing table that has an EDITPROC (see FIG. 3, 310);

(2) retrieving a set of information so that the desired modification can be performed (see FIG. 3, 320);

(3) updating the target table attributes using the set of information so that the target table evidences the desired modification (see FIG. 3, 330); and (4) committing the modified target table to DB2 to externalize the modified target table (see FIG. 3, 340).

AMEND also perform housekeeping after committing the modified table to DB2 such as deleting the shadow table and shadow tablespace, if one was needed. A shadow tablespace is required when the target table resides in a partitioned tablespace or exists in a DB2 default tablespace (a table is relegated to a default tablespace when the user does not define the tablespace at the time of table creation), then a new tablespace must also be created to accommodate the shadow table.

Additionally, AMEND is designed with rerun capabilities in the event that an initial attempt to perform an AMEND function is aborted or interrupted prematurely. AMEND can be interrupted by system failures, software failures, hardware failures, or any other event that would cause a DB2 programming session to end in a catastrophic manner, i.e., interrupted prior to successful completion. AMEND's rerun capabilities are provided as a mechanism for successfully completing a requested AMEND function prior to normal use of a database upon which an AMEND function had been prematurely interrupted. Unless AMEND is rerun and completed successfully, the database, upon which AMEND was operating, may be corrupted. (AMEND's rerun capabilities will be referred to below as the AMEND RERUN function.)

The AMEND RERUN function is designed to determine the point at which the initial AMEND function was interrupted and then to successfully complete the designed changes to the target table. The AMEND RERUN function checks for such things as the existence of a shadow table, the consistency of the catalog and the OBD information for the target table and indicators that AMEND sets during its normal operation. This information is then used by the AMEND RERUN function to successfully complete the desired changes to the target table. (See section 4.6 for further details.)

4.3 Replacement of Existing EDITPROC

The simplest case of the three functions mentioned above in the Summary of the Invention is that of dynamically replacing an existing EDITPROC definition with a different (new) one. Generally speaking, this involves: (1) creating a shadow table having identical structures and attributes as a target table except for a new EDITPROC definition (see FIG. 4, 420); (2) editing an existing EDITPROC entry in a target table's SYSCATALOG record (see FIG. 4, 440); (3) retrieving DBD and OBD information for the shadow and target tables (see FIG. 4, 450); (4) swapping the shadow table's OBD information with the target table's OBD information so that the target table's OBD information signifies the replacement of the existing EDITPROC definition with the new EDITPROC definition (all other attributes of the target table are maintained) (see FIG. 4, 460); and (5) committing the modified target table to DB2 (see FIG. 4, 470). (For the sake of convenience, the portion of AMEND that relates to replacing an EDITPROC will be referred to hereunder as AMEND REPLACE EDITPROC function.)

Figure 4:
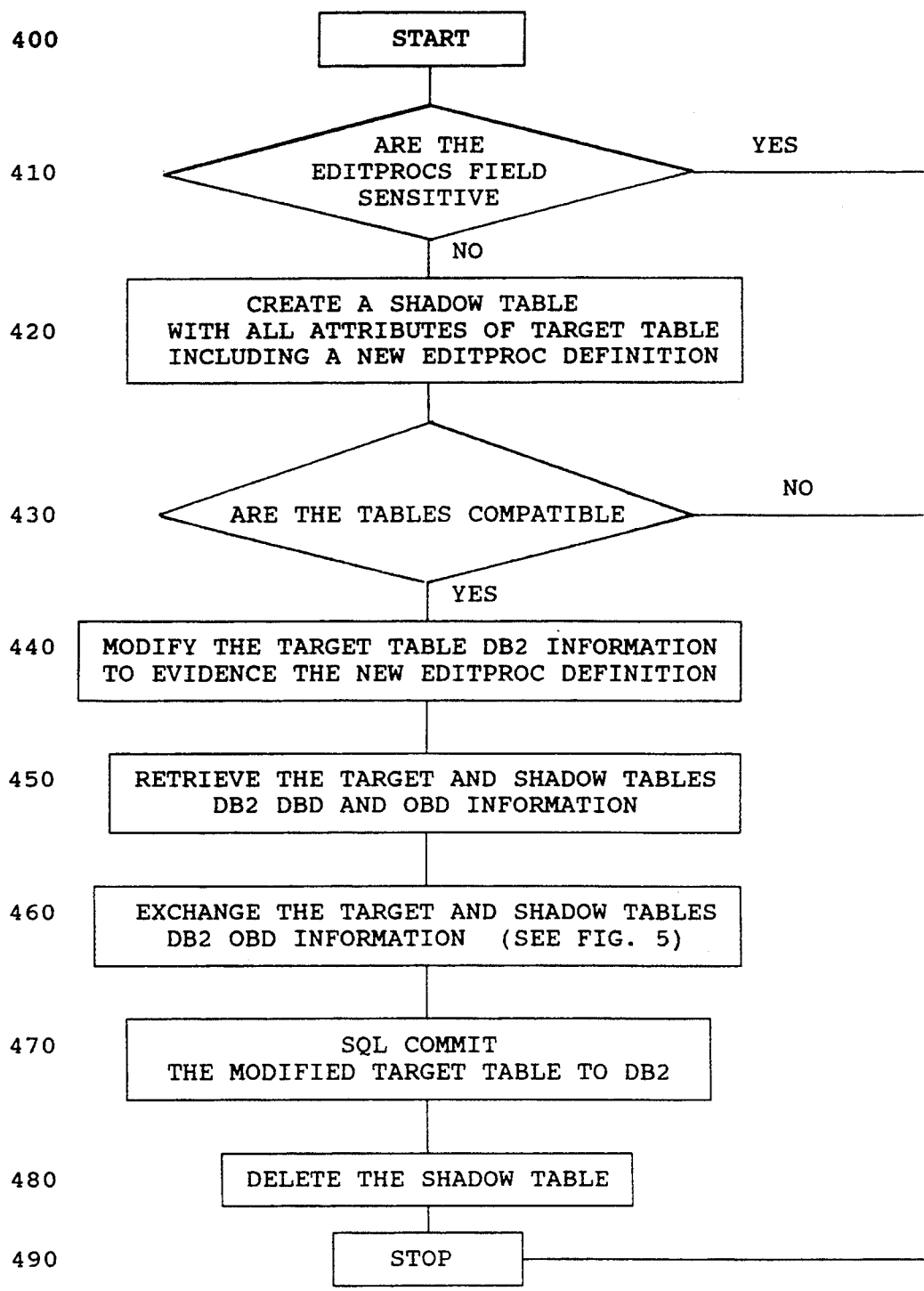

Initially, the AMEND REPLACE EDITPROC function determines whether the EDITPROC that will be added, and the EDITPROC being replaced, are identified by a particular code that indicates that the EDITPROCs are not field-sensitive, and terminates the AMEND process if such a code is not found, i.e., either EDITPROC is field-sensitive (see FIG. 4, 410).

Generally, AMEND operates only on EDITPROCs that are known or assumed not to be field-sensitive. AMEND assumes the field-insensitivity of BMC EDITPROCs, i.e., an EDITPROC distributed by the assignee of this application. Additionally, AMEND assumes that certain BMC EDITPROCs are field-insensitive, specifically those containing CSECTs whose names start with DPDLEM. AMEND does not, however, assume that non-BMC EDITPROCs are field-insensitive, but can, of course, make such an assumption in appropriate circumstances.

The AMEND REPLACE EDITPROC function next performs a number of operations that will ultimately allow AMEND to replace an existing (old) EDITPROC, EP-1, with a new EDITPROC, EP-2. These initial operations include: (1) creating a shadow table (sometimes referred to as Table Y below), an exact copy of the target table (sometimes referred to as Table X below) except that the shadow table has EP-2 as its defined EDITPROC (see FIG. 4, 420); (2) testing a target table's OBD information against the shadow table's OBD information for compatibility (see FIG. 4, 430); (3) issuing SQL STOP commands to stop the user tablespace and user database to block read and/or write access during the EDITPROC replacement; (4) searching SYSCATALOG SYSIBM.SYSTABLES records for a target table's EDITPROC name and record length field; (5) replacing EP-1 with EP-2 in the SYSTABLES; and (6) restarting the user database and the user tablespace with standard SQL commands. Optional SQL QUIESCE commands may also be issued, prior to searching SYSTABLES, to cause the database to flush any cached changes to DASD prior to the search step. (The initial steps 3–6 and the optional QUIESCE commands are the program steps represented by FIG. 4, 440.)

Program-wise, AMEND REPLACE EDITPROC function creates the shadow table, Table Y, (and a shadow tablespace if needed) from the SYSCATALOG database information maintained by DB2 for Table X obtained previously by AMEND using standard SQL commands. (This information constitutes a complete description of Table X.) Table Y is created as an almost exact duplicate of Table X in terms of its structure and attributes with the exception that the shadow Table Y, is created with the new EDITPROC, EP-2, defined thereon, i.e., the shadow Table Y is created to match the way the target table will appear to DB2 upon successful completion of the AMEND REPLACE EDITPROC function (or any other AMEND function for that matter). (References made to replace the EDITPROC, the EDITPROC definition, the EDITPROC name, or the EDITPROC positions are synonymous for the purposes of this application.)

The AMEND REPLACE EDITPROC function, as well as the other AMEND functions, create the shadow table with a specific and unique name. The shadow table name takes the general form of "BMCDPDdbid-Zobidnnn" where BMCDPD indicates that the shadow table was created by AMEND (BMC is the assignee's corporate name) using standard DB2 SQL create table commands, dbid is a four (4) digit hexademical field, the numeric value of the database that owns the target table, Z is the separator character, obid is a four (4) digit hexademical field, the numeric value of the target table, and nnn is a three (3) digit decimal field used for uniqueness. Shadow tables created by AMEND also have an associated comment field which identifies the type of AMEND function to be performed and is used by the AMEND RERUN function to determine the type of AMEND function that was interrupted. If AMEND must also create a shadow table space, the shadow tablespace is generated with the general designation "BMCdbidn" where BMC is an identifier field, dbid is a four (4) digit hexadecimal field, the numeric value of the user database, and n is single digit decimal field used for uniqueness. Of course, any unique naming scheme can be used equally well.

Generally, the shadow table is created in the same user database and in the same tablespace as the target table. However, as was mentioned above, if the target table resides in a partitioned tablespace or a DB2 default tablespace, then the AMEND REPLACE EDITPROC function must also create an shadow tablespace to support the shadow table.

Next, the AMEND REPLACE EDITPROC function issues an SQL CREATE statement to build the shadow table, Table Y, including the new EDITPROC EP-2, and SQL COMMITs it immediately. DB2 responds to the COMMIT statement by adding the Table Y definition to the DBD records for the user database; DB2 then allocates the additional space, as usual, in the DBD records for the user database.

Before proceeding with a modification, the AMEND REPLACE EDITPROC function verifies the compatibility of the target and shadow tables' OBD records by ensuring that both tables X and Y have either no segment extensions or both have segment extensions, otherwise the tables are incompatible and the function is terminated with appropriate conventional clean-up operations.

Next, the AMEND REPLACE EDITPROC function stops the user tablespace and user database to allow the modification of the catalog information defining the target table. The AMEND REPLACE EDITPROC function performs a standard VSAM input/output (I/O) function; it searches the SYSCATALOGs for data addresses needed by AMEND to modify the target table, i.e., to replace the existing EDITPROC, EP-1. It then uses the standard DB2 facility DSNUTILB to modify the DB2 catalog, i.e., replaces the old EDITPROC name in the catalog with the new EDITPROC name.

With the catalog information for the target table updated, the AMEND REPLACE EDITPROC function restarts the user database and tablespace to allow resumed activity by issuing standard SQL commands.

Once the preliminary tasks described above have been accomplished, AMEND REPLACE EDITPROC function performs a set of instructions that bring and lock the DBD and associated OBD data structures for the database that owns the target and the shadow tables into the EDM pool in the DB2 address space (see FIG. 4, 450). EDM, a acronym for Environmental Descriptor Manager, is a standard IBM routine that manages the DBDs and the OBDs. The lock is necessary for swapping the target and shadow table OBD information and is maintained until the AMEND REPLACE EDITPROC function releases the lock by a COMMIT command.

With the DBD and OBD information for the target and shadow tables locked in the EDM pool, the AMEND REPLACE EDITPROC function physically swaps (exchanges) certain target table OBD information and shadow table OBD information so that the target table will ultimately contain all the information to evidence the replacement of its original EDITPROC, EP-1, with the new EDITPROC, EP-2 (see FIG. 4, 460). The OBD information that is swapped includes the DB2 OBD OBDDMAP entries that point to the target and shadow tables' OBD entries and all other OBD entries except the following OBD entries are not swapped: OBDRECFL, OBDRELTH, OBDREXTO, OBDREMAL, OBDREBEG, OBDREDNM, OBDREEP, OBDRVANM, OBDRVEP, and OBDOROW.

Figure 5:
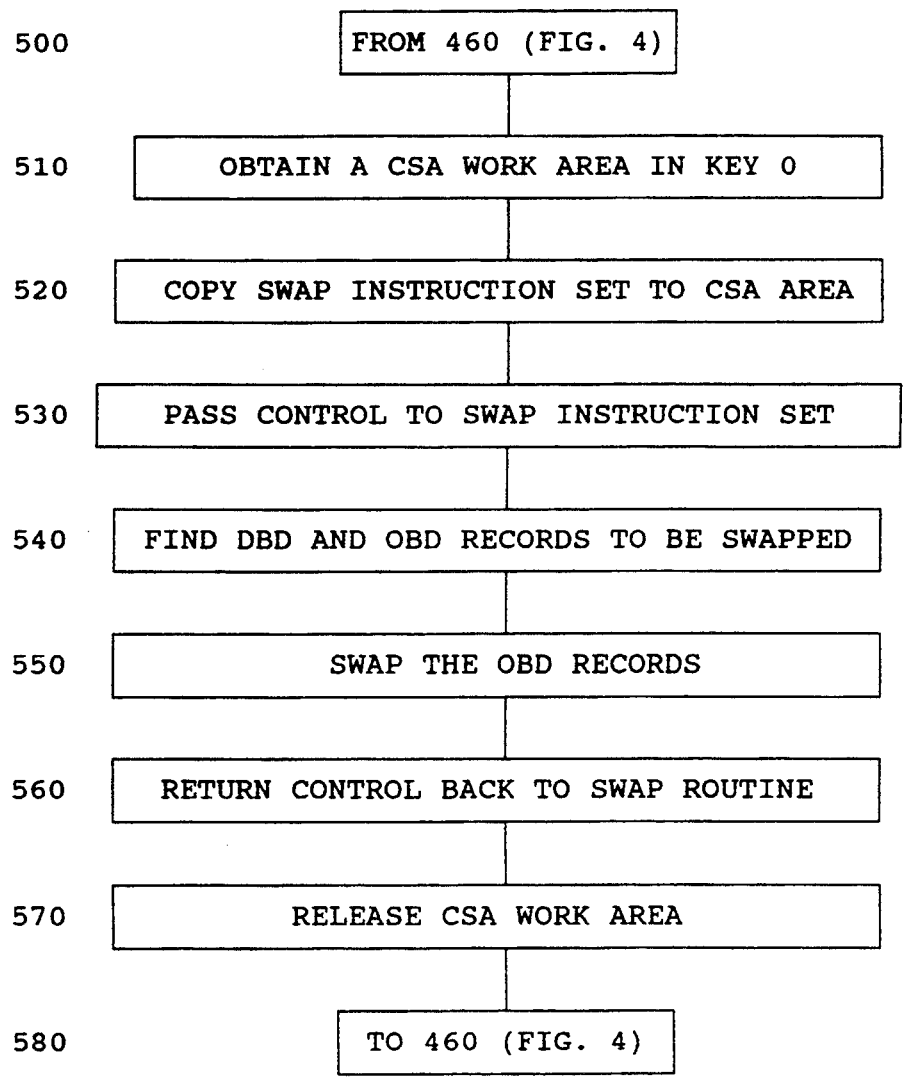

Generally, this process of swapping the target and shadow table OBD information involves (see FIG. 5): (1) obtaining a work area in key 0 CSA (see FIG. 5, 510); (2) copying a set of SWAP instructions to the CSA work area (see FIG. 5, 520); (3) passing program control from the AMEND REPLACE EDITPROC function to the copied SWAP instruction set so that the copied instructions can be executed in secondary address space mode (see FIG. 5, 530); (4) locating the target and shadow table OBD information to be swapped (see FIG. 5, 540); (5) swapping the target and shadow table OBD information while the SWAP instructions are set to secondary address space mode so that the target table will contain all its original attributes along with the new EDITPROC name (i.e., the target table's OBD information becomes the shadow table's OBD information and vise versa) (see FIG. 5, 550); (6) returning program control to the AMEND REPLACE EDITPROC function (see FIG. 5, 560); and (7) releasing the CSA work area (see FIG. 5, 570).

The OBD information for the target and shadow tables is in the EDM pool in the DB2 manager address space, and 370 cross memory instructions must be used to swap or edit OBD information for the target table. This task requires that the actual swapping of OBD information occur in CSA and be executed in secondary address space mode.

Typically, the step of locating the OBD information for the target and shadow tables to be swapped involves running through a DB2 control block chain. This chain includes a SSCT chain, a ERLY chain, a SCOM chain, a ACOM chain, and a EANC chain. Once the EANC DB2 control block chain has been located, the SWAP instructions chain to a ED chain and hash within the ED chain to find a EDRC chain for the target and shadow table. The SWAP instructions then scan the EDRC chain for the target and shadow table DBID that points to the DBD list for the two tables. The OBD information is then located and swapped.

The AMEND REPLACE EDITPROC function then issues a standard SQL COMMIT command to commit changes to DASD storage, i.e., to externalize the modified target table to the DBD01 dataset. Finally, the AMEND REPLACE EDITPROC function issues a set of housekeeping commands to optionally quiesce the DBD01 data set, as described above, and then deletes the shadow table and tablespace, if a tablespace was necessary. The AMEND REPLACE EDITPROC function, as well as all the other AMEND functions, terminate using standard DB2 clean up commands.

4.4 Adding an EDITPROC to a Table Without One

The second AMEND function, that of adding an EDITPROC to an existing table, is more complicated. The structure of the DBD and OBD records changes considerably when an EDITPROC is added. Suppose that a user wants to add an EDITPROC, EP-A, to a target table, Table X. The DBD and OBD records for the user database containing Table X have many entries packed together in a specific format. Adding an EDITPROC entry is decidedly non trivial because it might require a good deal of movement of data within the DBD and OBD records. Besides the changes to the OBD information, the "child" fanset INDEXES and fanset RI constraints much be updated to evidence that the target table has an EDITPROC.

Although adding an EDITPROC to an existing table is more complex than replacing an EDITPROC, the process steps needed to perform this AMEND function are analogous to the process steps for performing an EDITPROC replacement. (For convenience, the part of AMEND that relates to adding an EDITPROC will be referred to hereunder as the AMEND ADD EDITPROC function.)

Figure 6:
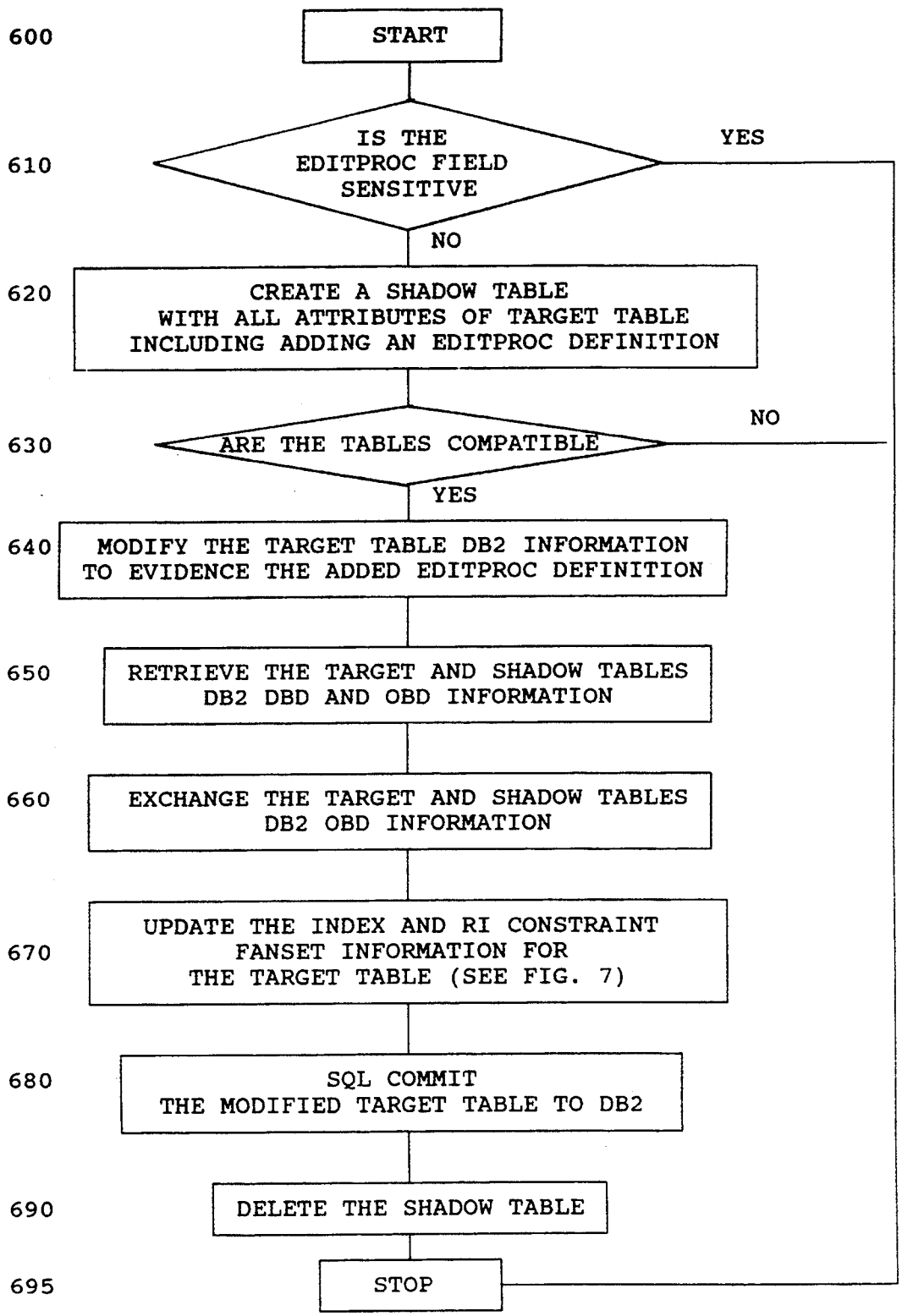

Generally speaking, this involves: (1) creating a shadow table having identical structures and attributes as a target table except for the addition of an EDITPROC (see FIG. 6, 620); (2) adding an EDITPROC to a target table's SYSCATALOG records (see FIG. 6, 640); (3) retrieving OBD information for the shadow and target tables (see FIG. 6, 650); (4) swapping the shadow table OBD information with the target table OBD information so that the target table OBD information signifies the add EDITPROC (all other attributes of the target table are maintained) (see FIG. 6, 660); (5) updating INDEXES fanset entries and RI constraints fansets entries associated with the target table so that all "parent" relationships evidence the added EDITPROC (see FIG. 6, 670); and (6) committing the modified target table to DB2 (see FIG. 6, 680).

Initially, the AMEND ADD EDITPROC function also checks the EDITPROC to be added for field-insensitivity, as described previously, and terminates if the EDITPROC is found to be field sensitive. The AMEND ADD EDITPROC function then creates a shadow table, Table Y, from the SYSCATALOG information for Table X obtained previously, having all the structures and attributes of Table X except Table Y also includes the EDITPROC to be added. Again, the shadow Table Y is created in the same tablespace as target Table X, unless the target Table X is part of a partitioned tablespace or was defined in a default tablespace, in which case the AMEND ADD EDITPROC function must also create a tablespace to accommodate the shadow table (see FIG. 6, 620).

The AMEND ADD EDITPROC function creates a shadow table by building an SQL CREATE statement, which builds the shadow table with the desired structures, descriptors and attributes, and immediately issues a SQL COMMITs command. DB2 responds to the COMMIT statement by adding the Table Y definition to the DBD for the user database; DB2 then allocates the additional space, as usual, in the DBD for the user database.

The AMEND ADD EDITPROC function also performs a compatibility check against the target and shadow OBDs and terminates AMEND, if the OBDs are not compatible as described above. (See FIG. 6, 630.)

The AMEND ADD EDITPROC function then stops the table space (optionally, the function issues SQL quiesce commands to quiesce the DBD01 and DSNDB06 databases) and the database and searches the SYSCATALOG SYSTABLES records for information concerning the target table. Next, the AMEND ADD EDITPROC function translates the DB2 information into IBM 370 hardware format. It then modifies the translated information, using standard 370 instructions, to indicate the change in catalog record-length entry that describes the record length of the table (specifically, the routine adds a 10-byte pad to the record-length entry to signify the addition of the EDITPROC). The modified information is finally retranslated back into DB2 internal format.

The AMEND ADD EDITPROC function then uses the DSNUTILB facility to write the modified and re-translated DB2 information, with the changed record length, back to the catalog; it also adds the name of the EDITPROC being added to the SYSTABLE list of EDITPROCs; and then it restarts the database and tablespace. (See FIG. 6, 640.)

Next, the AMEND ADD EDITPROC function brings and locks the DBD and OBD records into memory for both Table X and Table Y; it uses the swap process described previously to swap the shadow table, Table Y, OBD information with the target table, Table X, OBD information and vice versa. (See FIG. 6, 650–660.)

An advantage of this approach over that of the standard DSNUTILB utility is that DSNUTILB goes to DASD to get certain information needed to rebuild the DBD, e.g., information about deleted tables in the UDB, not all of which is in the SYSCATALOG. AMEND does not make the assumption that none of the information in the DBD can be relied on; as a result, the entire DBD need not be rebuilt.

Besides changing the OBD and catalog information for the target to evidence the inclusion of an EDITPROC, the AMEND ADD EDITPROC function must also maintain the integrity of all fanset information for the target table. The AMEND ADD EDITPROC function must update a target table's INDEX fanset information to indicate that the target table has an associated EDITPROC. The AMEND ADD EDITPROC function must also update a target table's RI constraint fanset information that are defined on the target table. This requires that the AMEND ADD EDITPROC function edits all the RI constraints that have the target table defined as the "child" so that the constraints indicate that the target table has an associated EDITPROC. Only the RI constraints that have the target table defined as the child need to indicate that the target table has an EDITPROC. (See FIG. 6, 670.)

Figure 7:
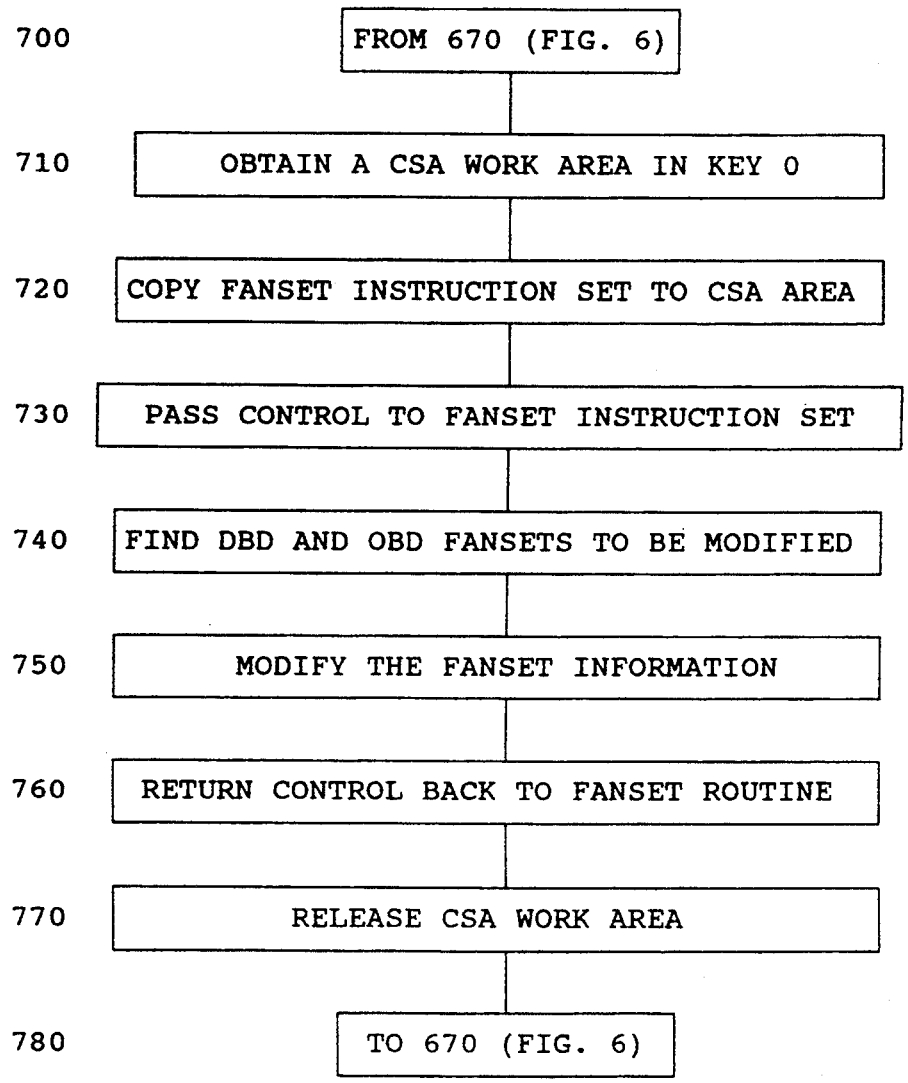

Generally, the process of modifying the target table fanset information involves: (1) obtaining a work area in key 0 CSA (see FIG. 7, 710); (2) copying a set of FANSET instructions to the CSA work area (see FIG. 7, 720); (3) passing program control from the AMEND ADD EDITPROC function to the copied FANSET instruction set so that the copied instructions can be executed in secondary address space mode (see FIG. 7, 730); (4) locating the target and shadow table OBD fanset information to be modified (see FIG. 7, 740); (5) modifying the target table fanset information while the FANSET instructions are set to secondary address space mode to evidence the inclusion of an EDITPROC (see FIG. 7, 740); (6) returning program control to the AMEND REPLACE EDITPROC function (see FIG. 7, 760); and (7) releasing the CSA work area (see FIG. 7, 770).

As in the swap method described in detail in section 4.3 relating to the AMEND REPLACE EDITPROC function, the target table OBD fanset information is located by running through the same DB2 control block chains (SSCT, ERLY, SCOM, ACOM, EANC, ED, and EDRC). Once the target table's DBD list is located, the FANSET instructions locate and modify the necessary fanset information including a target table's INDEX fanset information and RI constraint fanset information so that the target table's fanset information evidences the existence of an EDITPROC. The field that are modified include an OBDFSMIS byte, an OBDFSCPX flag in the OBDFSMIS which signifies that the fanset is a complex fanset (all fansets associated with tables defined with an EDITPROC must be complex), an OBDFSFL1 byte, and an OBDFSORH bit in the OBDFSFL1 byte which indicates whether there is an OBDOHKEY block in the fanset. If the OBDFSORH bit is on, i.e., there is an OBDOHKEY block, then the current value of an OBDFSFL2 byte is saved and an OBDKCPLX bit is turned on so that this key is set to complex, i.e., is associated with a DB2 table that has an EDITPROC defined thereon. The FANSET instructions then turn on an OBDKCPLX flag associated with each RI data constraint descriptor for which the target table is the child. All other RI data constraint descriptor OBDKCPLX flags are not altered (these constraints do not change when an EDITPROC is added to the target table by the AMEND ADD EDITPROC function).

As in the AMEND REPLACE EDITPROC function, the AMEND ADD EDITPROC function issues a standard SQL COMMIT command (externalizing the modified target table to DASD), optionally issues a SQL quiesce command to the DBD01 database, performs error-checking, deletes the shadow table and associated shadow tablespace, if one was needed to support the shadow table, and performs conventional DB2 clean-up operations. (See FIG. 6, 680–690.)

4.5 Adding a Column to a Table with an EDITPROC

The third case, that of adding a column to a user data table that has an EDITPROC, makes use of combinations of the techniques described above. This AMEND function is also accomplished by the same generic process as described previously.

Generally speaking, the function of adding a column to a table that has an EDITPROC involves: (1) creating a shadow table having identical structures and attributes as a target table except for a new column (see FIG. 8, 820); (2) modifying a target table's SYSCATALOG and OBD record entries to remove a target table's existing EDITPROC so that a column can be added (see FIG. 8, 840); (3) adding a new column to the target table (see FIG. 8, 840); (4) retrieving OBD information for the shadow and target tables (see FIG. 8, 860); (5) swapping the shadow table's OBD information with the target table's OBD information so that the target table's OBD information signifies the addition of a new column (all other attributes of the target table are maintained) (see FIG. 8, 860); (6) remodifying the target table's SYSCATALOG record entries to re-install the target table's EDITPROC (see FIG. 8, 870); and (7) committing the modified target table to DB2 (see FIG. 8, 880). (For the sake of convenience, the portion of AMEND that relates to adding an EDITPROC will be referred to hereunder as the AMEND ADD COLUMN function.)

Like the other AMEND functions, the AMEND ADD COLUMN function initially checks the field sensitivity of the EDITPROC and also performs a compatibility check against the target and shadow OBDs and terminates AMEND, if the EDITPROC is field sensitive or the OBDs are not compatible, as described above. (See FIG. 8, 810 and 830, respectively.)

Figure 8:
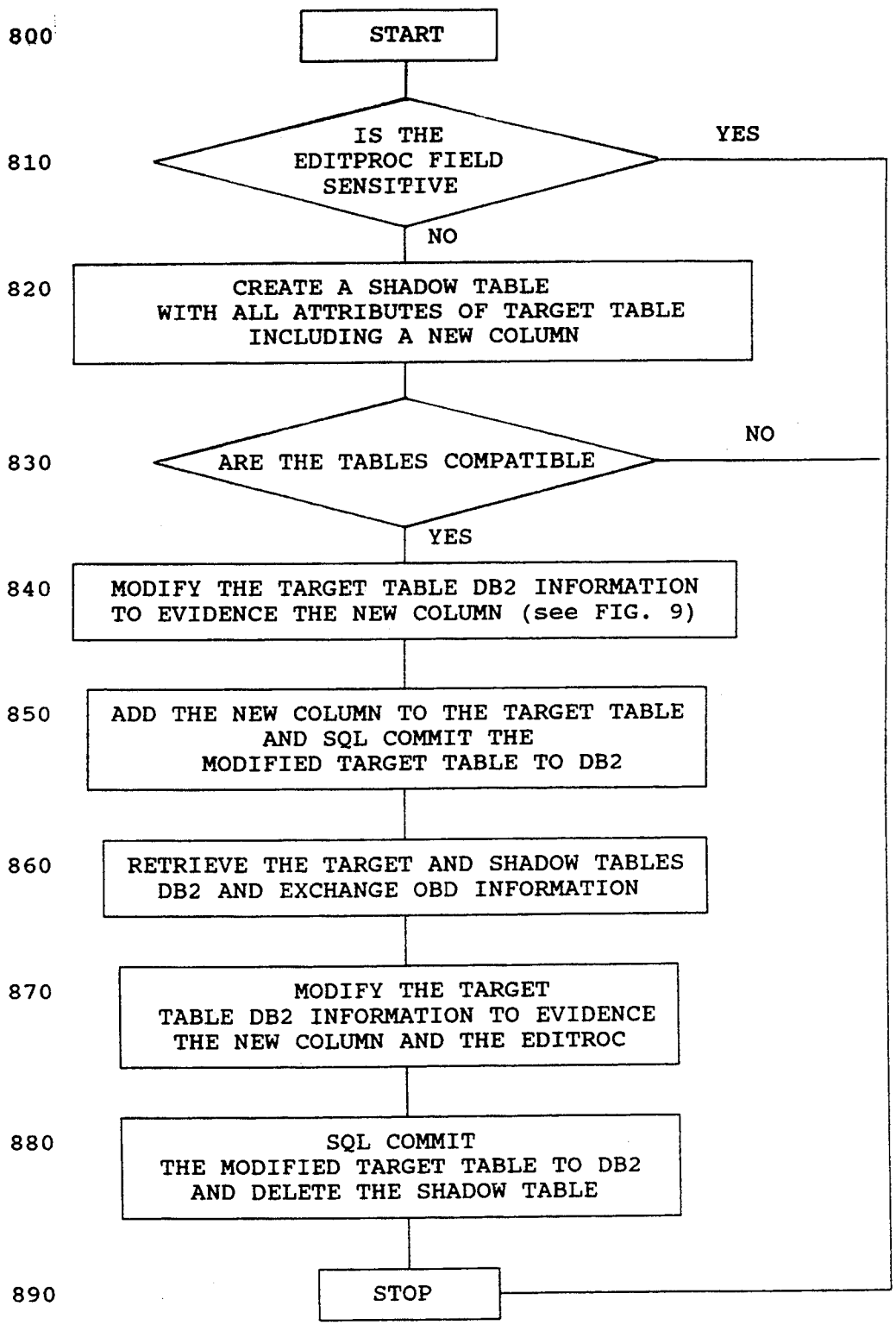

The AMEND ADD COLUMN function then builds a shadow table that includes both the added column and the original EDITPROC with all other structures, descriptors, attributes and the like of the target table identically maintained (see FIG. 8, 820). (The shadow table is designed to match the way the target table will ultimately look to DB2 after a column is added to target table. Thus, when the shadow table and target table OBD information are swapped the resulting target table will have a new column.)

Figure 9:
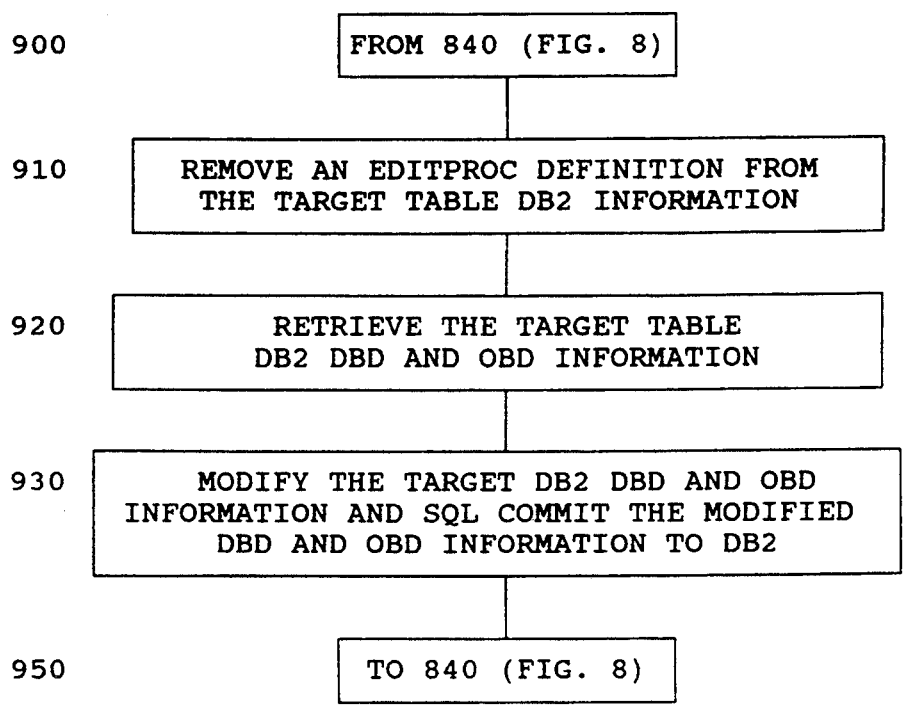

Next, the AMEND ADD COLUMN function modifies the SYSCATALOG records for the target table to allow for the addition of the new column. First, the function uses the standard DSNUTILB utility to remove the EDITPROC from the SYSCATALOG—after a sequential search through SYSCATALOG to find the EDITPROC name, the function constructs a request to DSNUTILB to delete the EDITPROC name and performs other housekeeping (e.g., modify the length-of-record field in the SYSCATALOG record to reflect deletion of the EDITPROC), and calls DSNUTILB with that request. As a result, the SYSCATALOG information for the target table appears to DB2 as though it does not have an EDITPROC. (See FIG. 9, 910.)

Next, the AMEND ADD COLUMN function goes to the DBD records for the target table to find the proper OBD records to be modified. The function then brings and locks the DBD and associated OBD records in the EDM pool and, then, erases the EDITPROC name, if present, perform housekeeping, etc. (See FIG. 9, 920–930.)

The SYSCATALOG and the DBD and OBD information now appear as though the target table does not have an EDITPROC. The AMEND ADD COLUMN function now uses the standard SQL ALTER command to add a column to the target table, which causes DB2 to take care of housekeeping details such as updating indices and the like. AMEND issues a COMMIT to save this modified target table. (See FIG. 8, 850.)

Next, the AMEND ADD COLUMN function locks both the target and shadow tables DBD and OBD records into the EDM pool and exchanges (swaps) the target and shadow tables' OBD information so that the target table's OBD information evidences the added column and the original EDITPROC, as described previously. The resulting target table now has the new column added and still has its original EDITPROC. (See FIG. 8, 860.)

The AMEND ADD COLUMN function next stops and (optionally) quiesce the user tablespace and database as well as certain DB2 internal databases (DBD01 and DSNDB06) and translates, modifies, and retranslates the SYSTABLES entry to re-install the target table's EDITPROC information and increase the record length by 10, in the reverse of the process described above for removing the EDITPROC information. The AMEND ADD COLUMN function then restarts the user database and tablespace. (See FIG. 8, 870.)

As in the other AMEND functions, the AMEND ADD COLUMN function issues a standard SQL COMMIT command (externalizing the modified target table to DASD), optionally issues a SQL quiesce command to the DBD01 database, performs error-checking, deletes the shadow table and associated shadow tablespace, if one was needed to support the shadow table, and performs conventional clean-up operations. (See FIG. 8, 880.)

4.6 Recovery from a Prematurely Ended AMEND Function

AMEND also has the ability to complete an AMEND function even in the event of a system failure or other catastrophic failure which interrupts the AMEND program prior to successful completion. Such interruptions can result in database corruption and desynchronization unless the AMEND function is completed.

To handle these interruption events, AMEND is capable of being rerun so that the intended modification to the target table can be completed prior to use of the database containing the target table. As AMEND performs its desired function, it writes certain information necessary for an AMEND rerun to determine where the initial AMEND program was when the interruption occurred. Some of the information relates simply to whether a shadow table was created and whether it still exists if it was created. When one of the AMEND functions creates a shadow table, the shadow table is created with a DB2 name and comment field. The name and comment field contain the type of function AMEND was performing and the name of the target table to which the shadow table is associated as previously described.

In the case of the AMEND REPLACE EDITPROC and AMEND ADD EDITPROC functions, this information is sufficient to allow the desired AMEND function to complete its task and make the database usable again.

In the case of the AMEND ADD COLUMN function, besides the information relating to the shadow table existence and name, this function also checks for the presence/absence of an EDITPROC defined on the target table, presence/absence of a new target table column, and presence/absence of an EDITPROC in the target table OBD records. With the shadow table information and this additional information, the AMEND RERUN function can also complete an AMEND ADD COLUMN function.

Of course, once the AMEND RERUN function determines the type of AMEND function that was being performed, control is passed to that function so that the uncompleted function can be completed successfully. For example, if the AMEND RERUN function determines that the interrupted function was to replace an EDITPROC, the rerun function will pass control to the AMEND REPLACE EDITPROC function which completes the uncompleted portion of its function. It should be obvious that upon completion of an AMEND rerun, the resulting target table has been modified as if the original AMEND run had completed successfully. It should also be recognized that the AMEND RERUN function can be distributed in the instructions for each AMEND function or localized in an independent set of instructions.

What is claimed is:

1. A method of dynamically modifying a DB2 target table, comprising the steps of:
   (a) creating a shadow table having all the structures and attributes of the target table except for a modification wherein the modification comprises one or more of:
      (1) replacing an existing EDITPROC of the target table with a new EDITPROC;
      (2) adding an EDITPROC to the target table; or
      (3) adding a column to the target table that has an EDITPROC;
   (b) retrieving a set of DB2 information so that the desired modification can be performed;
   (c) updating the target table attributes using the set of information from step (b) so that the target table evidences the desired modification; and
   (d) performing an SQL COMMIT of the modified target table to DB2.

2. The method of claim 1, wherein the modification comprises replacing an existing EDITPROC of the target table with a new EDITPROC.

3. The method of claim 1, wherein the modification comprises adding an EDITPROC to the target table.

4. The method of claim 1, wherein the modification comprises adding a column to the DB2 table which has an EDITPROC.

5. The method of replacing an existing EDITPROC, EP-1, of a DB2 target table, referred to as Table X, with a replacement EDITPROC, referred to as EP-2, comprising the steps of:
   (a) creating a shadow table, referred to as Table Y, that has EP-2 as its EDITPROC and that otherwise duplicates the structures and attributes of Table X;
   (b) modifying Table X DB2 catalog information to indicate that EP-2 is the EDITPROC for Table X instead of EP-1;
   (c) retrieving DBD and OBD information for Table X and Table Y into working storage;
   (d) exchanging the OBD information for Table X and Table Y to redesignate Table X as Table Y and vice versa;
   (e) Committing the modified catalog and OBD information for Table X; and
   (f) deleting Table Y from the user database.

6. A method of adding an EDITPROC, EP-1, to a DB2 target table, Table X, in a user database that does not have an EDITPROC comprising the steps of:
   (a) creating a shadow table, Table Y, that has EP-1 as its EDITPROC and that otherwise duplicates the structures and attributes of Table X;
   (b) modifying DB2 catalog information about Table X to signify that Table X has EDITPROC EP-1 by updating Table X DB2 catalog EDITPROC information and EDITPROC record length information;
   (c) retrieving DBD and OBD information for Table X and Table Y into working storage;
   (d) exchanging the OBD information for Table X and Table Y to redesignate Table X as Table Y and vice versa;
   (e) updating INDEXES and RI constraints fansets associated with the target table to reflect the added EDITPROC;
   (f) Committing the modified catalog and OBD information for Table X; and
   (g) deleting Table Y from the user database.

7. A method as in claim 6, wherein step 6(b) of modifying the DB2 catalog information describing Table X to make room for information indicating that Table X has an EDITPROC includes the substeps of:
   6(b)(1) translating said catalog information describing Table X from DB2 internal format into IBM 370 hardware format;
   6(b)(2) changing a record-length entry in said catalog information to increase the record length shown in said entry by 10 bytes; and
   6(b)(3) retranslating said catalog information back into DB2 internal format.

8. A method of adding a column, referred to as CA, to a user table, referred to as Table X, in a DB2 database that has an EDITPROC, referred to as EP-1, comprising the steps of:

(a) creating a shadow table, Table Y, that has EP-1 as its EDITPROC, that includes the column CA, and that otherwise duplicates the characteristics of Table X;
(b) modifying DB2 catalog information for Table X to indicate that Table X no longer has an EDITPROC;
(c) retrieving DBD and OBD information for Table X into working storage;
(d) modifying the DBD information and OBD information for Table X to indicate that Table X no longer has an EDITPROC, and Committing the modified DBD and OBD information;
(e) adding a column to Table X and Committing the modified Table X;
(f) retrieving DBD and OBD information for the modified Table X into working storage;
(g) exchanging OBD information for the modified Table X and Table Y to redesignate the modified Table X as Table Y and vice versa;
(h) modifying a DB2 catalog description of Table X to indicate that EP-1 is the EDITPROC for Table X;
(i) Committing Table X; and
(j) deleting Table Y.

9. A method of exchanging OBD information between two DB2 database tables Table X and Table Y, comprising the steps of:
(a) obtaining a work area in key 0 CSA;
(b) copying a set of SWAP instructions to the CSA work area from a main routine;
(c) passing program control to the copied SWAP instruction set from the main routine so that the copied instructions can be executed in secondary address space mode;
(d) searching through Table X and Y's DBD records for a OBD information to be swapped;
(e) swapping the Table X's OBD information and the Table Y's OBD information so that Table X contains Table Y's OBD information and Table Y contains Table X's OBD information;
(f) returning program control to the main routine; and
(g) releasing the CSA work area.

10. A method of updating fanset information for a DB2 database table, Table X, comprising the steps of:
(a) obtaining a work area in key 0 CSA;
(b) copying a set of FANSET instructions to the CSA work area from a main routine;
(c) passing program control to the copied FANSET instruction set from the main routine so that the copied instructions can be executed in secondary address space mode;
(d) searching through a Table X's DBD records for a OBD fanset information to be updated;
(e) modifying the Table X's fanset information to evidence the inclusion of an EDITPROC in Table X;
(f) returning program control to the main routine; and
(g) releasing the CSA work area.

* * * * *